Dec. 17, 1929.                G. R. HALL                1,740,400
                               AWNING
                          Filed May 9, 1928
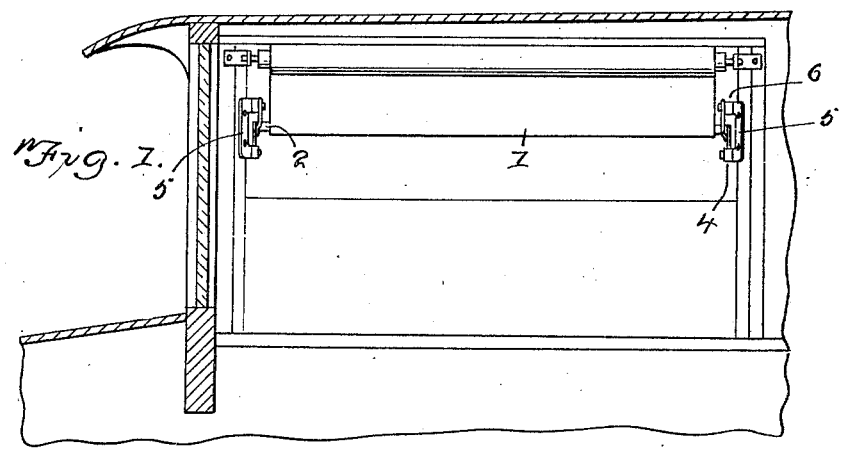
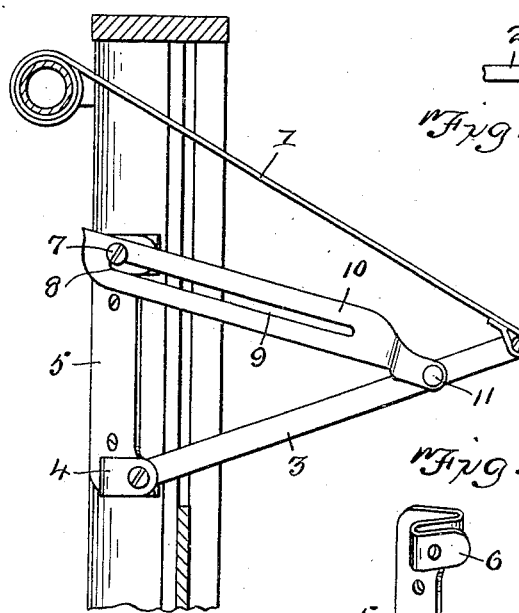
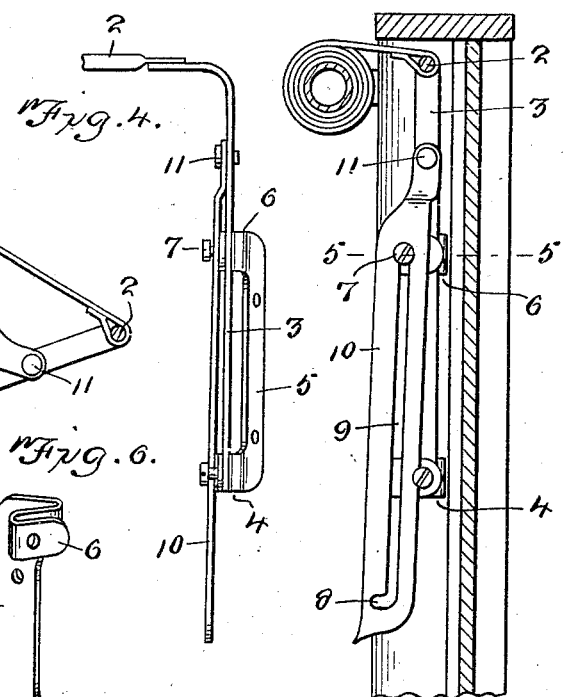
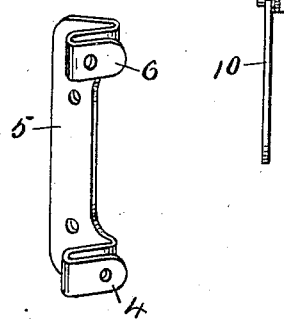
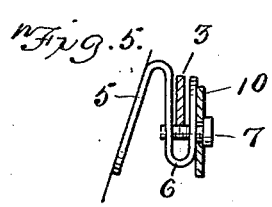
G. R. Hall INVENTOR
BY Victor J. Evans
ATTORNEY Patented Dec. 17, 1929

1,740,400

UNITED STATES PATENT OFFICE

GEORGE R. HALL, OF WATERVILLE, KANSAS

AWNING

Application filed May 9, 1928. Serial No. 276,441.

My present invention has reference to an improvement in awnings or shades especially adaptable for use on windows of automobiles in which a spring actuated awning will be held in extended position for use and will be automatically rolled to an out-of-the-way position when the holding means is released.

The improvement has particular reference to the holding means and is designed as an improvement upon the awning construction upon which I have applied for U. S. patent protection on March 23, 1927, the same bearing the Serial No. 177,756 and which was allowed Dec. 19, 1927.

The drawings illustrate the invention.

In the drawings:

Figure 1 is a sectional view taken through a portion of an automobile with the invention applied.

Figure 2 is an enlarged fragmentary sectional view with the awning extended.

Figure 3 is a similar view showing the awning rolled.

Figure 4 is an edge view to illustrate the pivotal connection between the tensioning bar and the brace bar that constitute the means for holding the awning extended.

Figure 5 is a sectional view approximately on the line 5—5 of Figure 3.

Figure 6 is a perspective view of the bracket that constitutes my improvement.

In my referred to allowed application Serial No. 177,756, the bracket that is attached to the sides of a window opening in an automobile is of a rigid construction and, therefore, does not conform to the shape of the side walls for the door or window openings in various types of automobiles. My present invention is of an extremely simple construction and comprises a member which is of bendable material so that the same can properly conform itself to the place upon which it is secured.

Referring now to the drawings in detail, the numeral 1 indicates a spring actuated awning. The awning has its outer or free end connected by a bar 2 to the upper ends of tensioning bars 3. The tensioning bars in the present instance have their inner ends pivotally secured between ears 4 that are formed by bending lateral extensions on the ends of metal plates 5 that constitute the brackets. The upper ends of these plates are screwed to the sides of the automobile door or window through which the curtain is movable. As the plate 5 is bendable the same can conform itself to different shapes of the walls provided by such openings or to the door jambs of different models of automobiles.

The second or upper ends of each of the plates 5 is provided with a lateral extension which is bent upon itself to provide the U-shaped portion that provides spaced ears 6 and passing through the outer ear there is a headed stud 7 whose shank is designed to be received in a notch 8 on one end of an elongated slot 9 in brace bars 10, the outer ends of the said brace bars being offset and reduced and pivoted, as at 11, to the tensioning bars 3.

The simplicity of my construction and the advantages thereof will, it is thought, be understood and appreciated without further detailed description.

Having described the invention, I claim:

A bracket for the tensioning and brace bars of awnings for automobiles, comprising a bendable plate that has its edge, at its opposite corners formed with substantially U-shaped spaced ears which are designed to be bent at various angles with respect to the plate and which are adapted to receive therein and have pivoted thereto the said brace and tensioning bars for the awning.

In testimony whereof I affix my signature.

GEORGE R. HALL.